UNITED STATES PATENT OFFICE.

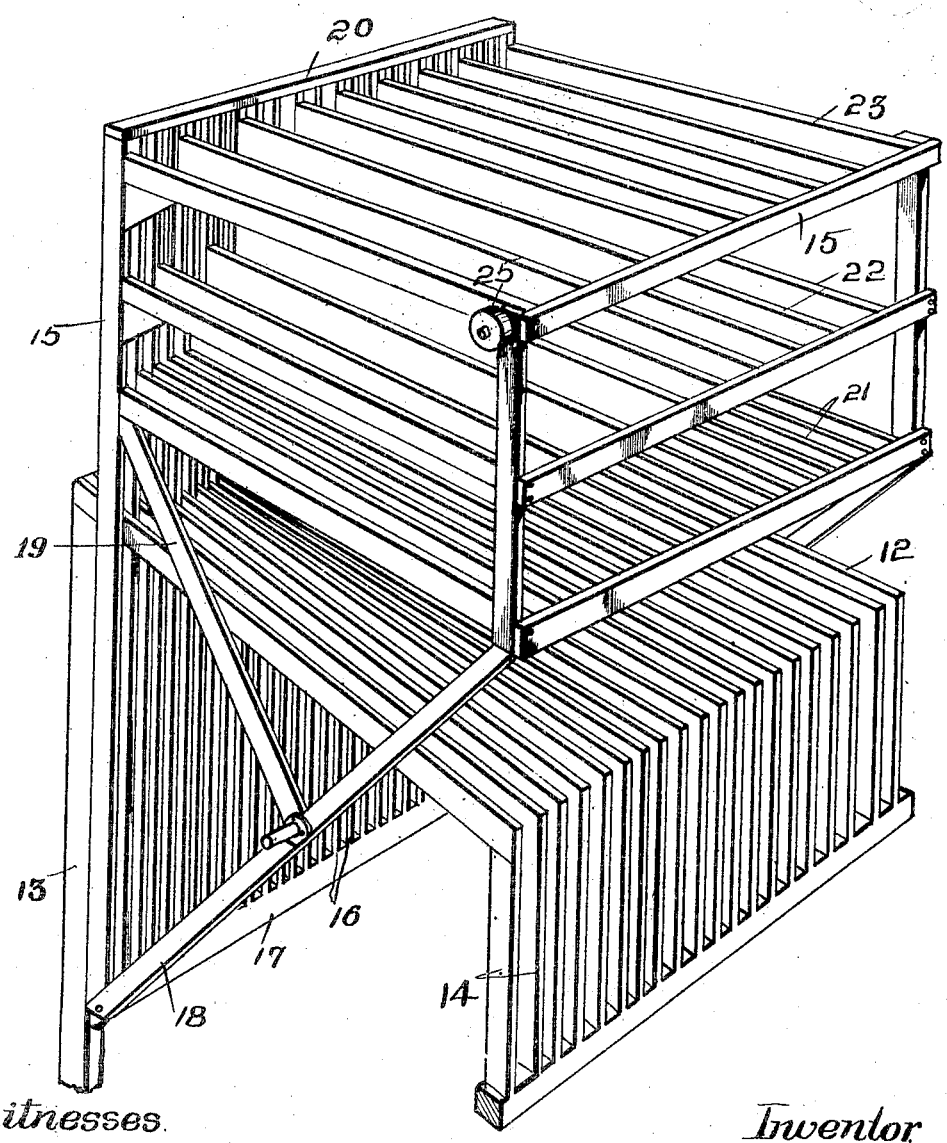

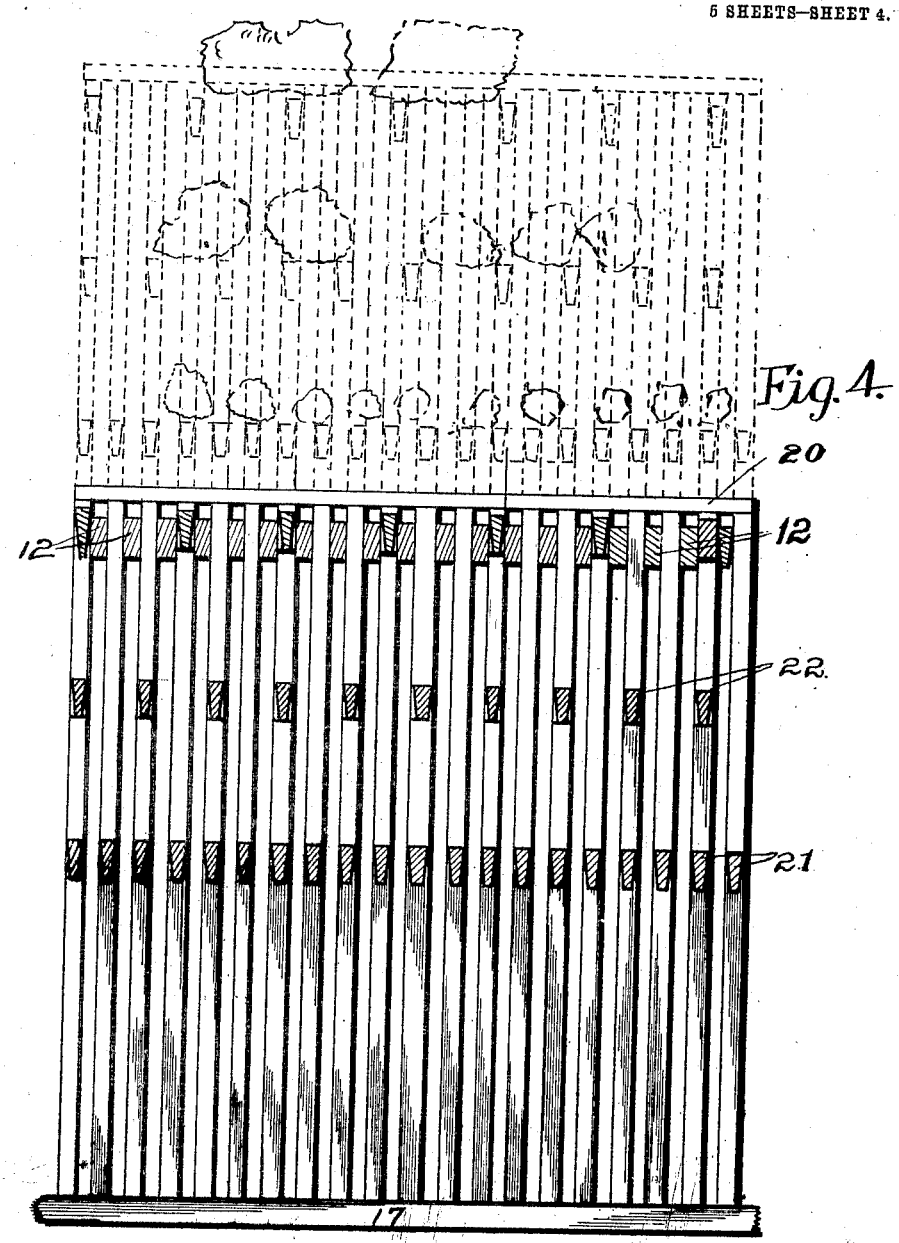

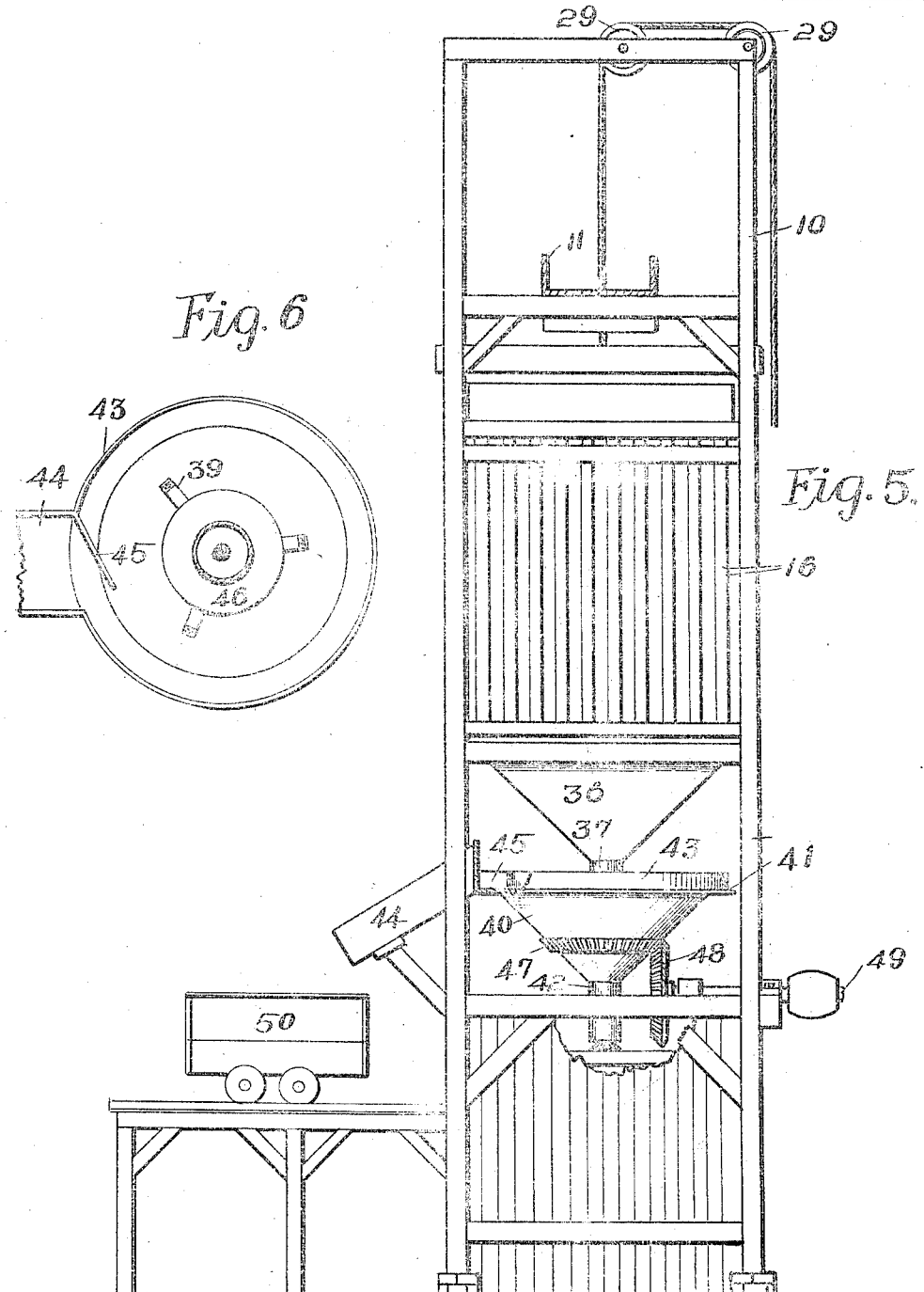

MARION T. ROMBAUER, OF NOVINGER, MISSOURI.

SCREENING AND SEPARATING APPARATUS.

1,051,267.

Specification of Letters Patent. Patented Jan. 21, 1913.

Application filed September 22, 1910. Serial No. 583,313.

*To all whom it may concern:*

Be it known that I, MARION T. ROMBAUER, a citizen of the United States, residing at Novinger, in the county of Adair and State of Missouri, have invented a certain new and useful Screening and Separating Apparatus, of which the following is a specification.

Figure 1:
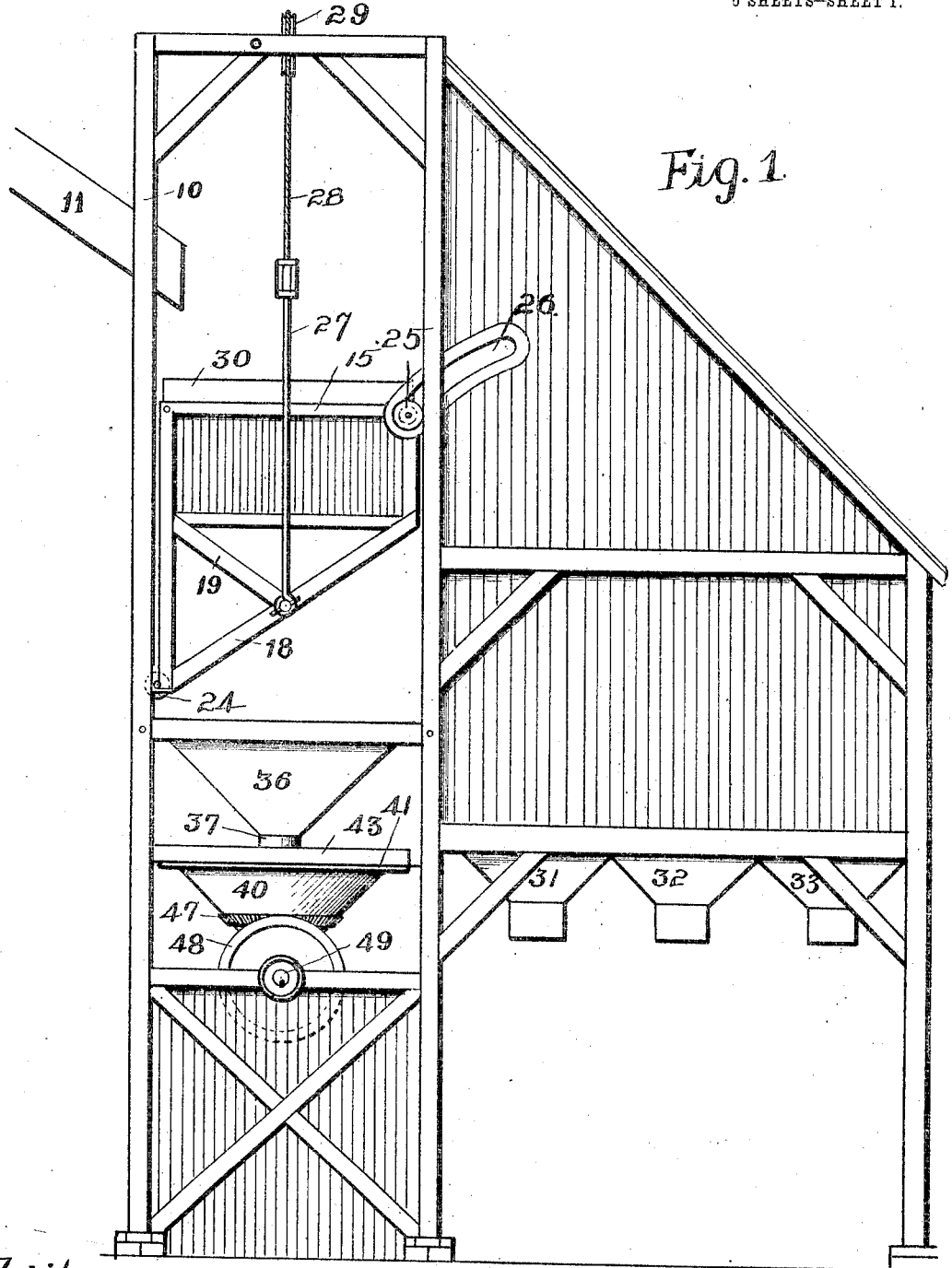
Figure 2:
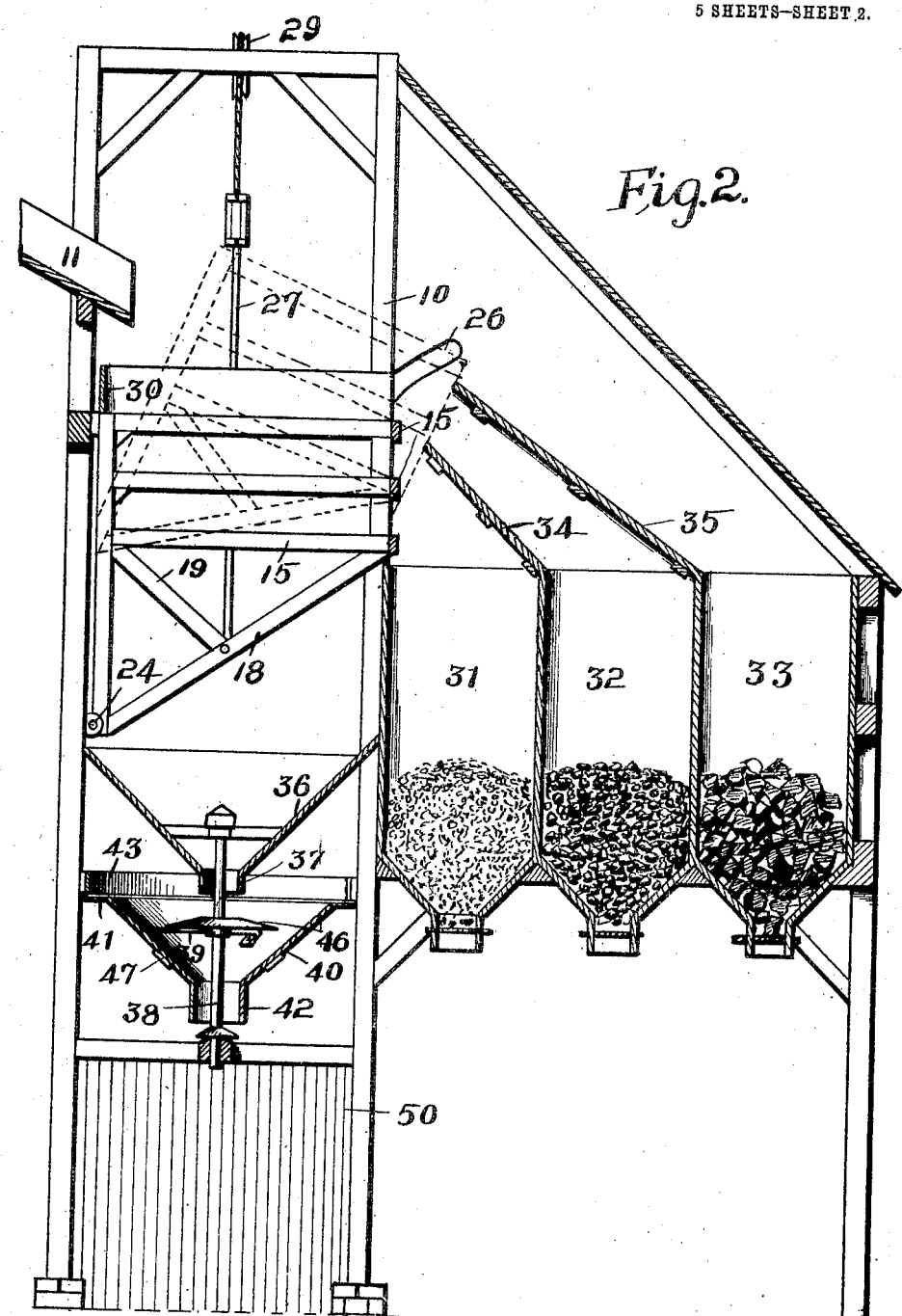

The object of my invention broadly is to provide an improved apparatus of this class of simple, durable and inexpensive construction that may be easily operated and by which coal or other material may be first screened to separate it into a number of different sizes and then the finer particles may be subjected to centrifugal action to thereby remove from the fine coal all of the heavier particles such, for instance, as particles of clay, sulfur, etc.
More specifically it is my object to provide a screening and grading apparatus in which the larger pieces of material are first removed to thereby leave the screening surface for the finer particles free and unobstructed so that the finer pieces may readily pass through without having the larger pieces occupy the screening surface and thereby impeding or preventing the passage of the smaller pieces through the screen.
A further object is to provide improved means in a device of this class for delivering the separated grades of material into separate and independent bins or receptacles.
My invention consists in the construction, arrangement and combination of the various parts of the device whereby the objects contemplated are attained, as hereinafter more fully set forth, pointed out in my claims and illustrated in the accompanying drawings, in which:

Figure 1 shows a side elevation of an apparatus embodying my invention. Fig. 2 shows a vertical, central, sectional view of same. The dotted lines in said figure show the screening and grading device in its dumping position. Fig. 3 shows an enlarged, detail, perspective view illustrating the stationary and movable screening and grading members, the movable member being at its upper limit of movement. Fig. 4 shows a vertical, transverse, sectional view of the screening and grading device with the movable member at its lower limit of movement. The dotted lines in said figure show the movable member in its elevated position with lumps of material of various sizes supported on the several sets of screening and grading bars to illustrate the manner in which the large lumps are removed first, then the next largest second, and so on. Fig. 5 shows a front elevation of a complete apparatus embodying my invention. Fig. 6 shows a detail, plan view, partly in section, illustrating the means for removing the heavier particles of material from the centrifugal separating device.

Referring to the accompanying drawings, I have used the reference numeral 10 to indicate a structural frame work for supporting my improved apparatus and 11 indicates a chute designed to deliver material to be graded and separated near the top of the frame.
My invention is preëminently intended for use in grading and separating coal or it may obviously be used for any other material. When used for coal it is preferably erected adjacent to a mine shaft and the mine elevator is designed to dump into the chute 11 to thereby deliver the material as it comes from the mine at the top of the frame 10. Arranged at a point slightly above the center of the frame 10 is a series of stationary screening and grading bars 12 extending from front to rear. These bars are supported at their rear ends by the upright bars 13 and at their forward ends by the upright bars 14. The advantage of thus supporting the bars 12 is that the movable screening and grading bars hereinafter described, may freely move up and down between the bars 12 without engaging the supports for the bars 12. Furthermore the upright bars serve an additional function as guides for the bars of the movable screening and grading members as will hereinafter appear.

The movable screening and grading member comprises a substantially rectangular frame 15 having at its rear a series of vertically arranged bars 16 that are arranged to slide up and down between the bars 12 of the stationary member. These bars 16 are connected at their lower ends by the beam 17 and brace bars 18 are extended from the ends of the beam 17 upwardly and forwardly to the lower corners of the frame 15 and additional braces 19 are extended from the centers of the braces 18 rearwardly and upwardly to the frame 15. The uprights 16 are also connected at their upper ends by the cross bar 20.

At the bottom of the frame 15 is the lower movable screen which consists of a series of screen bars 21, each connected at its rear end with one of the upright bars 16 and at its forward end with the frame 15. Each bar is also preferably made smaller at its lower edge than its upper edge, as clearly shown in Fig. 4, and the bars 21 are so spaced and positioned relative to the bars 12 that the said bars 21 may freely move downwardly between the bars 12 and the uprights 13 and 14 that support the bars 12. The said bars 21 are spaced apart far enough to prevent the passage of material through them of the smallest size which it is desired to remove from the material being screened and graded. Spaced a short distance above the screen bars 21 is a second series of screen bars 22 connected at their rear ends to the alternate ones of the upright bars 13, as shown in Fig. 4, and connected at their forward ends to the frame 15. These bars 22 are so spaced relative to the bars 12 that they may freely slide downwardly between the bars 12. The spaces between the bars 22 are approximately twice as great as the spaces between the bars 21 and therefore they will prevent the passage of lumps of material that are about twice as large as the lumps that will be screened out by the bars 21. At the top of the frame 15 is a third series of screen bars 23. These bars are spaced apart farther than the bars 22 and are connected at their rear ends to the uprights 16 and at their forward ends to the frame 15. They are also so arranged as to pass through between the bars 12 as shown in Fig. 4. At the rear lower ends of the braces 18, I have provided rollers 24 to engage an adjacent portion of the frame 10 to prevent friction. At the forward upper corners of the frame 15, I have provided the laterally projecting rollers 25 which are extended through curved slots 26 supported by the frame 10 and so arranged that as the frame 15 is elevated its upper end will be tilted downwardly and forwardly far enough to permit the material of various grades on the movable screen bars to be discharged forwardly and downwardly.

In order to elevate the frame 15, I provide a bail 27 pivoted at its lower ends to the central portion of the braces 18, as shown in Fig. 1, and connected at a point above the frame 15 to a rope or cable 28 which is passed over an elevated pulley 29 in the frame 10. I preferably provide an upwardly projecting flange 30 surrounding the back and sides of the stationary and movable grading and screening member, as shown in Fig. 2. This flange is omitted from Figs. 3 and 4, its function being to prevent material on top of the screen bars from rolling off at the back or sides.

Arranged in front of the screening and grading device are three bins or hoppers 31, 32 and 33. Between the hoppers 31 and 32 is an inclined partition 34 extending upwardly and rearwardly from a point between said hoppers and between the hoppers 32 and 33 is another inclined partition 35. These partitions terminate at their upper ends at points where the screening and grading bars of the movable screening and grading member will, in their tilted positions, as shown by dotted lines in Fig. 2, discharge the larger lumps of material on top of the partition 35 and into the hopper 33, the medium sized ones on top of the partition 34 and into the hopper 32, and the smaller sized ones directly into the hopper 31.

In practical operation with this part of my improved apparatus a quantity of material such as coal is deposited on top of the bars 23 and 12 and within the flange 30. None of the material can pass through the screen bars so long as they are in said position. After the material has all been deposited the rope or cable 28 is pulled upon and the movable screening and grading member is elevated and tilted forwardly. The first effect of this movement is for the bars 23 to engage the larger lumps of material and elevate them above the mass of finer material. During this elevating movement the bars 23 will also be tilted forwardly so that the large lumps of material will roll forwardly over the bars to thereby permit any small material that may be resting on top of said lumps to pass through between the bars 23. All of the material that passes through between the bars 23 will enter into the compartment above the bars 22 and the larger lumps of material will be engaged by the bars 23 and supported by them while the finer material will pass through. As the bars 22 pass upwardly through between the bars 12 the material will be agitated and turned over in such a manner that all of the fine material will readily pass through the bars 22 and the larger lumps will roll over the bars 22 toward the front end of the movable screening and grading member. All of the material that passes through between the bars 22 will drop into the space above the bars 21 and will be engaged by said bars 21 and turned over and agitated and rolled toward the front so that all of the material of a size that will not pass through between the bars 21 may pass downwardly between the bars 12 while the material that rests on top of the bars 21 will roll forwardly. When the movable screening and grading device has reached its upper limit of movement it will be tilted forwardly in such a manner that the coarse material on top of the bars 23 will enter the hopper 33, the material on the bars 22 will enter the hopper 32, and the material on the bars 21 will enter the hopper 31. After the material has thus been discharged the movable screening and grading member may be lowered to its original position.

In order to provide for removing very fine material such as the particles of coal that have passed through the stationary screening and grading member from heavier substances such as clay, sulfur, etc., I have placed below the screening and grading device a hopper 36 having a discharge spout 37 at the center of its lower end. Below this hopper 36 is a centrifugal separating device comprising an upright shaft 38 rotatably supported in suitable bearings. Fixed to the upright shaft 38 is a series of radial arms 39 to which a separating plate 40 is fixed. This separating plate is substantially circular in shape and has its sides inclined from a point near its center upwardly and outwardly and provided at its top with a horizontal portion 41. At the lower central portion of the plate 40 is a discharge spout 42. Above the part 41 of the plate is a circular upright rim 43 fixed to the frame 10 and having a discharge spout 44 therein. A deflector arm 45 is fixed to the rim 43 at one side of the spout and it extends in a direction toward the other side of the spout and toward the interior of the plate 40, as clearly shown in Fig. 6. Mounted on the shaft 38 above the arms 39 is a circular deflecting plate 46 which rotates in unison with the plate 40 and which is inclined from its central portion downwardly and outwardly, as clearly shown in Fig. 2. For rotating the plate 40, I have provided a rim 47 having beveled gear teeth thereon fixed to the exterior of the plate 40 and in mesh with a beveled pinion 48 on a power shaft 49. Beneath the discharge spout 42 is a hopper 50 to receive the fine material that passes through the spout 42 and adjacent to the discharge end of the chute 44 is a car 51 through which the material discharged through said spout may be received and carried to a point of discharge.

The practical operation of the centrifugal separator part of my apparatus is as follows: Assuming that the separating plate 40 is being rotated at a certain predetermined speed it will cause the shaft 38 to be rotated by means of the arms 39 which are attached directly to the plate 40 and this will rotate the deflector plate 46. The material that passes down through the spout 37 will strike on top of the deflecting plate 46. This will serve the double function of preventing such material from passing straight down through the spout 42 and it will also tend to partially separate the heavier particles from the lighter ones. On account of the centrifugal action applied to the various particles of material on the deflector plate 46 the heavier particles will be thrown approximately straight outwardly and the lighter ones will drop down and strike the plate 40 below the point where the heavier particles strike it so that a certain amount of separation of the light and heavy particles takes place before they reach the plate 40. When the material strikes the plate 40 the centrifugal action will cause the heavier particles to move horizontally outward and they will also slide up and toward the horizontal part 41 while the lighter particles will slide down the inclined sides of the plate 40 toward the discharge spout 42.

I have provided for collecting the heavier particles of material by means of the deflector arm 45 which is so arranged as to cause the particles to all be collected and discharged through the spout 44. In the operation of separating the heavier and lighter particles on the plate 40, the action of gravity tends to move all of the particles downwardly through the discharge spout 40 while the centrifugal action tends to move all of the particles toward the periphery of the plate 40 and up. However by turning the plate 40 at a certain predetermined rate of movement the opposed actions of gravity and centrifugal movement will operate in such a manner that the lighter particles may move down through the spout 40 and the heavier ones will work through the mass of lighter particles on account of their lighter weight and the greater amount of centrifugal action applied to them and will be discharged against the rim 43 and be gradually thrown out through the spout 44.

I claim as my invention.

1. In a device of the class described, the combination of a screen formed of bars equally spaced apart, a second screen formed of bars equally spaced apart farther than the bars of the first screen, and means for moving the second screen from a point adjacent to the first, to a point spaced above the first, so that material of a certain size will be retained on the first screen and material of the larger size will be retained on the second screen.

2. In a device of the class described, the combination of a screen formed of bars equally spaced apart, a second screen formed of bars equally spaced apart farther than the bars of the first screen, and means for moving the second screen from a point adjacent to the first, to a point spaced above the first so that material of a certain size will be retained on the first screen and material of a larger size will be retained on the second screen, and means for tilting the second screen to remove the material contained thereon.

3. In a device of the class described, the combination of a screen, comprising stationary bars equally spaced apart, a second screen comprising bars equally spaced apart the same distance as the bars on the first screen, a third screen above the second comprising bars equally spaced apart farther than the bars of the second screen, and means for moving the second and third screens from position with the third screen adjacent to the first screen to position with the second and third screens above the first.

4. In a device of the class described, the combination of a screen, comprising stationary bars equally spaced apart, a second screen comprising bars equally spaced apart the same distance as the bars on the first screen, a third screen above the second comprising bars equally spaced apart farther than the bars of the second screen, and means for moving the second and third screens from position with the third screens adjacent to the first screen to position with the second and third screens above the first, and means for tilting the second and third screens to discharge the material contained thereon.

5. In a device of the class described, the combination of a screen, comprising stationary bars equally spaced apart, a second screen comprising bars equally spaced apart the same distance as the bars on the first screen, a third screen above the second comprising bars equally spaced apart farther than the bars of the second screen, and means for moving the second and third screens from position with the third screen adjacent to the first screen to position with the second and third screens above the first, means for tilting the second and third screens to discharge the material contained thereon, and two independent receptacles positioned to receive the material discharged from said second and third screens when tilted.

6. In a device of the class described, the combination of a stationary screen, comprising bars equally spaced apart, a frame capable of vertical movement and also capable of being tilted, two screens fixed to said frame one above the other, the lower screen comprising bars equally spaced apart at least as far as the bars of the stationary screen, and the upper screen on the frame comprising bars spaced apart farther than the bars on the stationary frame, both screens on the movable frame being capable of entering between the bars on the stationary screen and said frame being capable of movement to position with its lower screen above the stationary screen, whereby the larger material will be retained on the upper screen on the frame, smaller material will be retained on the lower screen on the frame and any material passing through the lower screen on the frame will also pass the stationary screen.

7. In a device of the class described, the combination of a stationary screen, comprising bars equally spaced apart, a frame capable of vertical movement and also capable of being tilted, two screens fixed to said frame one above the other, the lower screen comprising bars equally spaced apart, at least as far as the bars of the stationary screen, and the upper screen on the frame comprising bars spaced apart farther than the bars on the stationary frame, both the screens on the movable frame being capable of entering between the bars on the stationary screen and said frame being capable of movement to position with it its lower screen above the stationary screen, whereby the larger material will be retained on the upper screen on the frame, smaller material will be retained on the lower screen on the frame any material passing through the lower screen on the frame will also pass the stationary screen, and means for elevating and tilting the frame.

8. In a device of the class described, the combination of a series of stationary bars parallel with each other and spaced apart, a vertically movable frame, a series of upright strips at one side of the movable frame extended between the stationary bars, two sets of bars fixed to the movable frame, one end of each bar being fixed to the adjacent upright strip, the bars at the top of the movable frame being spaced apart from each other farther than the bars on the series below it.

9. In a device of the class described, the combination of a series of stationary bars parallel with each other and spaced apart, a vertically movable frame, a series of upright strips at one side of the movable frame extended between the stationary bars, two sets of bars fixed to the movable frame, one end of each bar being fixed to the adjacent upright strip, the bars at the top of the movable frame being spaced apart from each other farther than the bars on the series below it, curved guides for the movable frame, and rollers fixed to the movable frame and inserted in said curved guides, said parts being so arranged that when the movable frame is raised it will also be tilted at the same time.

10. In a device of the class described, the combination of a series of stationary bars parallel with each other and spaced apart, a vertically movable frame, a series of upright strips at one side of the movable frame extended between the stationary bars, two sets of bars fixed to the movable frame one end of each bar being fixed to the adjacent upright strip, the bars at the top of the movable frame being spaced apart from each other farther than the bars on the series below it, curved guides for the movable frame, rollers fixed to the movable frame and inserted in said curved guides, said parts being so arranged that when the movable frame is raised it will also be tilted at the same time, and a number of inclined partitions arranged in position adjacent to the series of bars on the movable frame to receive material discharged therefrom and to conduct such material to independent points of discharge.

Des Moines, Iowa, August 26, 1910.

MARION T. ROMBAUER.

Witnesses:
MARY WALLACE,
ELIZABETH SKAHILL.